United States Patent
Billaud

(10) Patent No.: US 11,604,269 B2
(45) Date of Patent: Mar. 14, 2023

(54) METHOD FOR DETECTING CONFLICTS IN THE II/SI IDENTIFICATION CODE OF A MODE S RADAR WITH NEARBY RADARS, AND SECONDARY RADAR IMPLEMENTING SUCH A METHOD

(71) Applicant: THALES, Courbevoie (FR)

(72) Inventor: Philippe Billaud, Limours (FR)

(73) Assignee: THALES, Courbevoie (FR)

( * ) Notice: Subject to any disclaimer, the term of this patent is extended or adjusted under 35 U.S.C. 154(b) by 198 days.

(21) Appl. No.: 17/089,663

(22) Filed: Nov. 4, 2020

(65) Prior Publication Data
US 2021/0156989 A1    May 27, 2021

(30) Foreign Application Priority Data
Nov. 25, 2019  (FR) ..................................... 1913154

(51) Int. Cl.
*G01S 13/78* (2006.01)
*G01S 13/933* (2020.01)
(Continued)

(52) U.S. Cl.
CPC ............ *G01S 13/784* (2013.01); *G01S 7/021* (2013.01); *G01S 13/762* (2013.01); *G01S 13/782* (2013.01); *G01S 13/933* (2020.01)

(58) Field of Classification Search
CPC ...... G01S 13/784; G01S 7/021; G01S 13/762; G01S 13/782; G01S 13/933;
(Continued)

(56) References Cited

U.S. PATENT DOCUMENTS

| | | | | |
|---|---|---|---|---|
| 5,081,457 A | * | 1/1992 | Motisher | G01S 13/933 342/40 |
| 7,936,300 B2 | * | 5/2011 | Billaud | G01S 13/782 342/39 |
| 2012/0162014 A1 | * | 6/2012 | Wu | G01S 5/10 342/387 |

FOREIGN PATENT DOCUMENTS

| | | |
|---|---|---|
| EP | 3 502 735 A1 | 6/2019 |
| FR | 3 082 949 A1 | 12/2019 |

(Continued)

OTHER PUBLICATIONS

"Principles of Mode S Operation and Interrogator codes", Eurocontrol, XP002454133, Mar. 18, 2003.

(Continued)

*Primary Examiner* — Peter M Bythrow
(74) *Attorney, Agent, or Firm* — BakerHostetler

(57) ABSTRACT

A method for detecting conflicts in the II/SI identification code of radars nearby a secondary mode-S radar, includes at least: a first step wherein the radar detects unsolicited unsynchronized replies, i.e. fruits, in a region of extended radar coverage; a second step wherein the radar detects a conflict in II/SI code by analyzing geographic regions of radar coverage common to the radar and to at least one nearby radar, a conflict being detected if the radar: detects, in the region of extended coverage, the presence of fruits that have as source the nearby radar; observes the absence of fruits caused by the nearby radar in that region of radar coverage of the radar which does not overlap with the region of radar coverage of the nearby radar; the region of overlap between the radar coverage of the radar and the radar coverage of the nearby radar forming a region of conflict in II/SI code.

8 Claims, 13 Drawing Sheets

(51) Int. Cl.
*G01S 7/02* (2006.01)
*G01S 13/76* (2006.01)

(58) Field of Classification Search
CPC ...... G01S 13/765; G01S 13/781; G01S 13/87; G01S 13/91; G01S 13/74; G01S 13/42; G01S 13/913; G08G 5/0095
See application file for complete search history.

(56) References Cited

FOREIGN PATENT DOCUMENTS

| | | |
|---|---|---|
| FR | 3 085 487 A1 | 3/2020 |
| GB | 2 477 103 A | 7/2011 |
| GB | 2 518 364 A | 3/2015 |

OTHER PUBLICATIONS

Koga, et al., "Results of validation of SSR mode S interrogator identifier code coordination", Digital Avionics Systems Conference, Oct. 23, 2009.
Kim, et al., "Blended secondary surveillance radar solutions to improve air traffic surveillance", Aerospace Science and Technology, vol. 45, pp. 203-208, May 27, 2015.

* cited by examiner

METHOD FOR DETECTING CONFLICTS IN THE II/SI IDENTIFICATION CODE OF A MODE S RADAR WITH NEARBY RADARS, AND SECONDARY RADAR IMPLEMENTING SUCH A METHOD

CROSS-REFERENCE TO RELATED APPLICATIONS

This application claims priority to foreign French patent application No. FR 1913154, filed on Nov. 25, 2019, the disclosure of which is incorporated by reference in its entirety.

FIELD OF THE INVENTION

The invention relates to the field of air-traffic control (ATC) in which radar performance, most particularly as regards detection of aircraft in mode S, is of paramount importance, a success rate of about 99% being expected.

BACKGROUND

Air-traffic control is mainly based on mode-S radar, the detection and decoding reliability of which is widely recognized. The performance achieved with mode-S radars is especially related to the fact that radar are identified by aircraft via their II/SI code (II being the acronym of interrogator identifier). To limit electromagnetic interference and thus to increase the reliability of the transactions of a radar, mode-S radars lock the targets that they are managing, in their region of coverage and responsibility, to their II/SI identity, preventing these targets from responding to non-selective mode-S interrogations.

The following is in particular one technical problem to be addressed. In case of overlap of the coverage of nearby radars, it is necessary for the radars to have different II/SI identities. In the contrary case, i.e. in the case where two nearby radars share the same II/SI code, each of the two radars is unable to see targets that have already been locked by the other radar. A serious failing in terms of safety results.

In the prior art, various ways of detecting the presence, in the coverage of a radar, of aircraft not responding to the all-call interrogations of this radar because locked by a nearby radar using the same II/SI code have been proposed. A first solution is disclosed in the document GB201000946. By design, this solution works only with aircraft equipped for ADS-B Out. It requires the radar to be equipped or associated with a local ADS-B_in receiver with which it communicates.

Another solution is proposed in the document GB201316553. It consists in detecting a conflict in II/SI code between nearby interrogators by comparing the inbound and outbound detection ranges of the radar. Specifically, an outbound aeroplane exiting from the coverage of a radar A is managed in selective mode, and therefore right up to the limit of the operational coverage of radar A, whereas an inbound aeroplane entering into the coverage of radar A (coming from the coverage of a radar B) is seen by the station of radar A only when the other radar, radar B, stops locking it. If there is an overlap of the coverage between radars A and B, it therefore occurs inside the coverage of radar A and therefore at a distance smaller than the limit of its coverage.

The detection of regions of conflict in II/SI code is therefore limited in the prior art:
- either by the equipment (ADS-B_out) that aircraft require to be seen;
- or by the post factum observation of the discrepancy between inbound and outbound coverage; and
- finally, the prior art does not provide any means for getting round conflicts in II/SI codes to detect aircraft.

Another standardized approach used with mode-S stations consists in coordinating radars using the same II/SI identifiers into SCN clusters (SCN being the acronym of surveillance co-ordination network), this requiring cross-border ground infrastructure so that the radars may exchange at will the positions of targets in their common regions, via a high-reliability ground network. In addition to the drawback of the use of a complex structure, the problem of human errors is not addressed.

SUMMARY OF THE INVENTION

One aim of the invention is in particular to mitigate the problems associated with II/SI codes shared between nearby radars, without the drawbacks of the prior art. To this end, one subject of the invention is a method for detecting conflicts in the II/SI identification code of radars nearby a secondary mode-S radar, said method comprising at least:
- a first step in which said radar detects unsolicited unsynchronized replies, i.e. fruits, in a region of extended radar coverage;
- a second step in which said radar detects a conflict in II/SI code by analyzing geographic regions of radar coverage common to said radar and to at least one nearby radar, a conflict being detected if said radar:
  - detects, in said sub-regions of extended coverage, the presence of DF11 fruits of same II/SI code as said radar, having as source said nearby radar;
  - observes the absence of DF11 fruits caused by said nearby radar in that region of radar coverage of said radar which does not overlap with the region of radar coverage of said nearby radar;
- the region of overlap between the radar coverage of said radar and the radar coverage of said nearby radar forming a region of conflict in II/SI code.

In one particular mode of implementation, said method comprise a third step in which said radar detects targets locked by said nearby radar in said region of conflict, the detection of DF4, DF5, DF20 or DF21 fruits caused by said nearby radar in said region of conflict indicating the presence of a target in said region of conflict.

In said first step, in response to the UF11 all-call interrogations of said radar, listening for synchronized DF11 replies after the all-call period and during the roll-call period provides, for example, additional synchronized replies in said extended region, said additional replies thus obtained being processed as other synchronized replies in the all-call period to construct DF11 hits having the attributes of a conventional mode-S hit.

Said target is pre-located in an azimuthal region inside said region of conflict by for example exploiting the absolute value of the time difference between the fruits of said target and each of the fruits of the targets of said extended region generating DF11 fruits that are caused by said nearby radar, the azimuthal position of each of said target being known.

Another subject of the invention is a radar able to implement said method.

Said radar for example includes means for continuously processing unsynchronized mode-S replies, independently of the listening periods associated with the interrogations transmitted by said radar.

Said processing means for example detect and decode said unsynchronized replies by exploiting the radiation patterns of the antenna of said radar separately:
- to detect all the, unsynchronized and synchronized, replies received via said antenna;
- to decode replies of any type, the data of the messages and to extract the mode-S address therefrom;
- to enrich each decoded reply with its characteristics, said characteristics being at least the detection time, the azimuth of the main lobe of the antenna on detection and the power received through the antenna radiation patterns.

Said radar comprises for example an extractor of DF11 hits in said region of extended coverage, DF11 hits being extracted beyond the operational range solely with a view to location and identification of targets via their mode-S address.

Said radar comprises for example processing means for detecting conflicts in II/SI codes and for detecting and locating targets locked by said nearby radar in any regions of conflict in II/SI code, said means:
- associating fruits with synchronized hits;
- geographically analyzing sources of DF11_R2 fruits, DF11_R2 meaning that the DF11 fruit is an unsynchronized reply the source of which is a nearby radar R2;
- isolating the presence of targets not detected by said radar in said region of conflict;
- evaluating the azimuthal pre-location of said targets with respect to said radar in said region of conflict;
- detecting and locating said targets distancewise and azimuthally in order to allow said radar to continue its surveillance function as for all the other targets.

BRIEF DESCRIPTION OF THE DRAWINGS

Other features and advantages of the invention will become apparent from the following description, which is given with reference to the appended drawings, which show.

DETAILED DESCRIPTION

Figure 1:
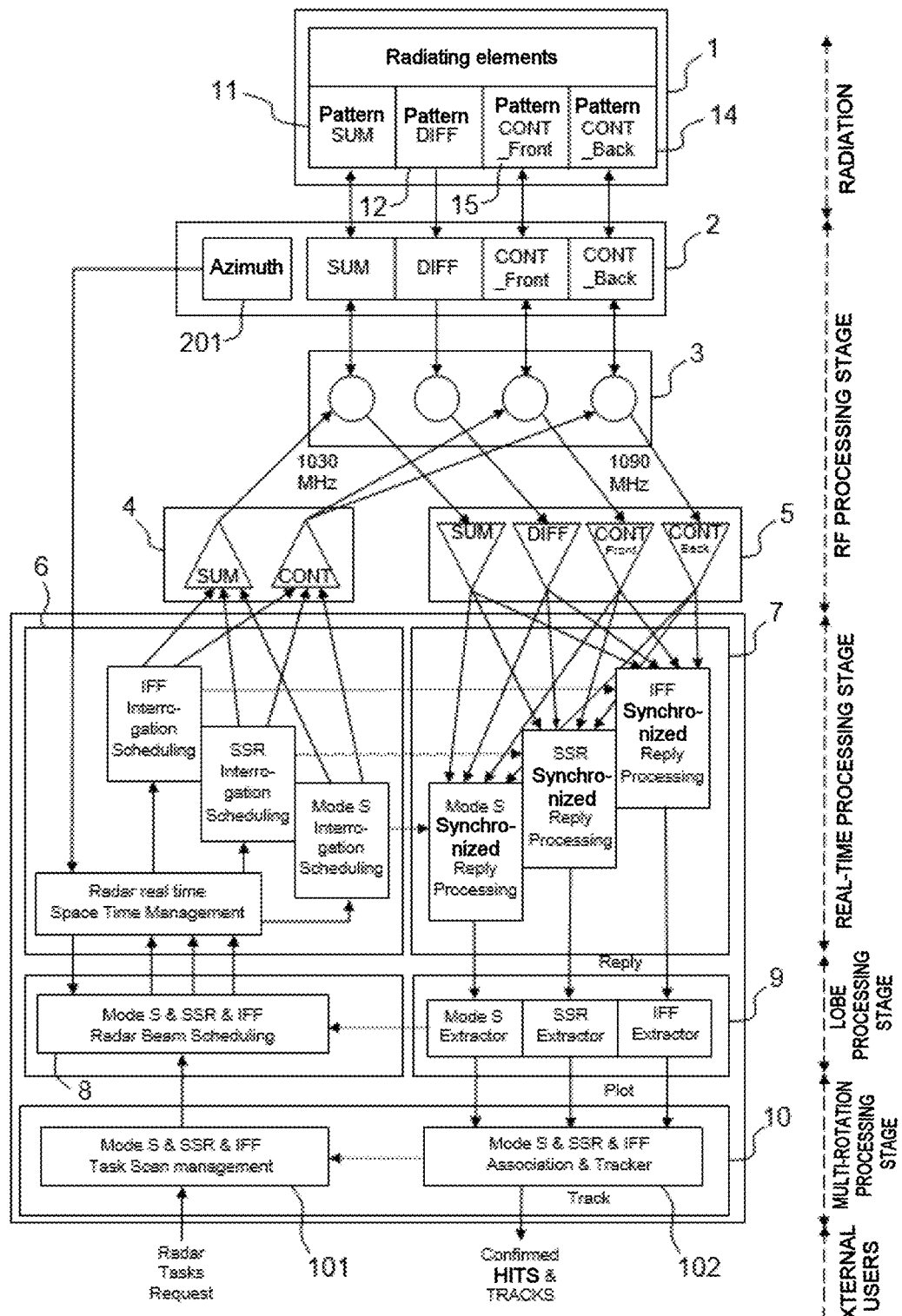
FIG. 1, an exemplary overview on a prior-art mode-S radar.

With reference to FIG. 1, which shows an exemplary overview of a mode-S radar, the principle of such a radar will be recalled. The principle of mode-S secondary radars (the interfaces of which with the transponder are defined in detail by the ICAO in Annex 10 of Vol. 4) consist in:
- transmitting selective interrogations:
  - either indicating the intended recipient: a single target designated by its mode-S address;
  - or indicating the identifier of the sender;
- receiving selective replies:
  - either indicating the identifier of the sender: the same mode-S address of the target;
  - or indicating the intended recipient: the identifier of the interrogator;
- the main content of which depends on the message:
- in acquisition phase (temporary, at the runway threshold) DF11: mode-S address of the target;
- in ELS (ELS being the acronym of elementary surveillance)
  - DF4: altitude;
  - DF5: identity (mode A);
- in EHS (EHS being the acronym of enhanced surveillance)
  - DF20: altitude+BDS register, the number of which is known inter alia via the interrogation that called it;
  - DF21: identity (mode A)+BDS register, the number of which is known inter alia via the interrogation that called it.

When used in the conventional way, secondary radar operates in synchronized mode, i.e. it transmits an interrogation and waits for a reply that is consistent therewith, this allowing the target to be located via measurement (of azimuth and distance) and identified (via its mode-S address).

To perform this task effectively, the radar is equipped with an antenna 1 (FIG. 1) having a plurality of radiation patterns 11, 12, 14, 15 the roles of which are conventionally:
- a sum pattern 11, denoted SUM below, for interrogating and detecting the synchronized reply of the target;
- a difference pattern 12, denoted DIFF, for finely locating the target in the SUM beam;
- a first control pattern 15, denoted CONT_Front, for blocking and rejecting replies from targets facing the antenna but not present in the main SUM beam;

a second control pattern 14, denoted CONT_back, for blocking and rejecting replies from targets behind the antenna (and therefore necessarily not present in the main SUM beam).

Depending on the mission and therefore on the expected performance level of the radar, the antenna may have:
a plurality of radiation patterns:
patterns: SUM, DIFF, CONT_Front & CONT_Back;
3 patterns: SUM, DIFF, CONT (CONT_Front and CONT_Back grouped together at the antenna)
2 patterns: SUM, DIFF/CONT (DIFF, CONT_Front & CONT_Back grouped together at the antenna);
the dimensions of which patterns are set:
widthwise:
so as to obtain a fine main beam that is of large width, provides a high gain and that is selective and precise azimuthally;
heightwise:
so as to obtain a large height (LVA antenna, LVA being the acronym of large vertical aperture) and to provide gain and protection against ground reflections (ATC mainly); or
so as to obtain a small height (open-array antenna providing mobility) (mainly used for IFF).

Whereas the SUM and DIFF patterns are conventionally narrow with 3 dB lobes between 2.4° and 10°, it is desirable for the CONT_Front and CONT_Back patterns to each cover practically 180°.

The antenna may also be:
of fixed radiation pattern, i.e. a rotating "mechanical" pattern; or
have a fixed or rotating variable electronically scanned pattern, i.e. be an AESA.

In the rest of the description, the most complete antenna configuration, i.e. a rotating antenna with 4 radiation patterns, will be described, the other configurations being treated similarly whatever the number of antenna radiation patterns employed and whether the antenna rotates or is fixed. However, to simplify the description it will be possible to use the 3-pattern configuration with CONT grouping CONT_Front and CONT_Back.

The antenna 1 transmits the radiation of the interrogations at 1030 MHz and receives replies in return at 1090 MHz, via the four radiation patterns: SUM, DIFF, CONT_Front and CONT_Back, or three radiation patterns (SUM, DIFF, CONT) or two radiation patterns (SUM, DIFF/CONT).

In a rotating antenna, a rotary joint 2 and antenna down leads ensure:
the RF coupling, between the rotating portion and the fixed portion of the radar, of the signals transmitted at 1030 MHz and received at 1090 MHz, independently for the four radiation patterns;
transfer of the azimuthal position 201 of the axis of the main lobe of the antenna.

An RF-processing stage comprises:
a duplexer or circulator 3 that ensure the RF coupling between the signals transmitted at 1030 MHz and received at 1090 MHz, independently for the four radiation patterns;
a transmitter 4 that:
transmits interrogations at 1030 MHz via the SUM pattern;
blocks transponders outside of the SUM lobe at 1030 MHz via the CONT_Front and CONT_Back patterns;
the transmitter doing this for all the various secondary protocols: IFF, SSR and mode 5,
a receiver 5 that receives replies at 1090 MHz via the four patterns SUM, DIFF, CONT_Front and CONT_Back and computes the angle error for the various secondary protocols: IFF, SSR and mode S.

A real-time processing stage comprises:
a spatio-temporal manager 6 that manages in real time the interrogating periods and associated listening periods, for the various secondary protocols: IFF, SSR and mode 5,
a signal processor 7 that:
processes the replies in the listening periods associated with the interrogations, for the various secondary protocols: IFF, SSR and mode 5,
detects and decodes synchronized replies in the main lobe of the antenna, by exploiting the four radiation patterns:
SUM: to detect replies received in the main lobe;
DIFF: to finely locate azimuthally the replies received in the main SUM lobe and potentially to degarble garbled replies;
CONT_Front and CONT_Back: to reject replies received via side SUM and DIFF lobes in the case of detection in the main SUM lobe.

A stage of processing the main lobe of the antenna comprises:
a manager 8 of targets present in the lobe, which:
prepares (interrogation-reply) transactions to be carried out in the next lobe, for the various secondary protocols: IFF, SSR and mode 5,
manages the IFF, SSR, all-call mode-S and roll-call mode-S periods of the lobe;
dynamically places selective mode-S interrogations and replies in the next roll-call period depending on the state of the transactions that have just been carried out and on any new inbound aircraft entering into the lobe;
extractors 9 that generate hits for each for the various secondary protocols: IFF, SSR and mode S, on the basis of the synchronized replies received in the lobe and depending on the protocol employed for the interrogations.

A multi-rotation processing stage 10 comprises:
a manager 101 of the mode-S tasks to be performed regarding targets in coverage, which predicts target positions (antenna intersection) and prepares tasks to be performed that are associated with these positions because of internal requests, external requests and the state of the transactions of preceding rotations;
associates hits and tracking 102 of targets in coverage, ensuring targets are tracked with a view to improving performance (especially by removing false hits and checking decoded data) and predicting the future position thereof mainly, but not only, in mode S.

A user interface allows the radar to take into account various requests, and the hits of targets and tracked targets to be viewed.

Having recalled the way in which a mode-S secondary radar operates, and before the invention is described in more detail, the principle of implementation thereof is described below. The solution according to the invention analyses the environment of a radar A by exploiting the fruits that this radar, radar A, receives, or rather that it no longer receives in case of conflict in II/SI code. Fruits (acronym of the expression "false reply unsynchronized in time") are unsynchronized replies not induced by the radar. These fruits are:
either induced by another interrogator (another radar, WAM, TCAS, etc.) sharing the same space;
or are automatically generated by the target itself (ADS-B, etc.).

Fruits are characterized by:
the mode-S address of the target;
the power received via the radiation patterns of the antenna;
the azimuth of the antenna;
the radar time of the reception thereof.

The mode-S fruits are messages (mode-S replies of various downlink format (DF)) that aircraft transmit to other radars R2, R3, R4, etc. Depending on the format of the message, the latter provides information on the identity of the aircraft and, sometimes, depending on the nature of the reply, on the identity of another radar (R2, R3, R4, etc.) with which the aircraft is communicating. If the aircraft is referenced by this radar R1 using its mode-S address, which is also present in the fruits, this allows a spatial region in which there is a conflict in the II/SI codes of the radar R1 and the radar R2 to be located, via geographical analysis, almost in real time.

Specifically, in case of use of the same II/SI code by nearby radars R1 and R2 sharing a region of common coverage, discrepancies are observed in the distribution of the fruits in the environment, compared to the case of operation with different II/SI codes. These discrepancies are in particular the following:
  no target in the RF common region (the region beyond the operational region) generates DF11 fruits because the two radars R1 and R2 lock aeroplanes to the same II/SI code;
  targets in each uncommon region of coverage of each radar, R1 or R2, generates DF11 fruits of same II/SI code;
  because each radar R1, R2 locks aeroplanes in its coverage to its II/SI code, which is the same as that of the other radar, whereas aeroplanes beyond the two regions of coverage of the two radars R1, R2 generate DF11 fruits with the II/SI code of the two radars R1, R2;
  because they are no longer locked by either of the two radars, i.e. neither R1 nor R2.

A complete analysis of this type allows a region in which a conflict in the II/SI codes of the radars R1 and R2 is present to be flagged and located azimuthally with respect to R1 (and R2, respectively).

In addition, in the common region, the radar R1 may detect the following fruits:
  DF4 fruits, giving altitude,
  DF5 fruits, giving identity (mode A),
  DF20 fruits, giving altitude and the required BDS register,
  DF21 fruits, giving altitude and the required BDS register,
    generated by the ELS (acronym of elementary surveillance) or EHS (acronym of enhanced surveillance) operational mode-S transactions of radar R2 with the aeroplanes:
  allowing a mode-S target as yet unknown to the radar R1 to be detected.

The almost synchronized generation (temporal analysis) of the DF4/5/20/21 fruits of such a target with DF11 fruits of other targets with the same radar R2 allows, in a few rotations:
  the DF4/5/20/21 fruits of each target to be isolated with the radar R2;
  a new target as yet not detected in the region of II/SI conflict to be pre-located in azimuth of radar A:
  either by temporal analysis based on the time difference between the DF4/5/20/21 fruits of this target and the DF11 fruits generated by other targets the position of which is known to R1,
  or via the signature that the radar R1 assigns to each DFxx fruit depending on the energy received from the fruit via each antenna radiation pattern (SUM, DIFF, CONT)—see patent FR No 1800657 for the details of this principle applied to ADS-B (DF17) squitters.

The conflict in II/SI code in the region common with R2 makes listening for the DF11 reply to a UF11 all call of the radar R1 pointless; nevertheless, it remains useful for the acquisition of new targets that are closer by. Thus, to precisely locate this target distancewise (and better still azimuthally), the radar R1 will, solely at the pre-located azimuth of the target, complement its all-call periods with a 3rd selective interrogation with the mode-S address of the target, over a quite large listening range (since the fruits of this target are unsynchronized, they provide no information on its distance). It is possible to add a 3rd mode-S (UF4 or UF5) interrogation to a given all-call period already containing an unselective (UF11) mode-S interrogation and an SSR (MA/MC/M1/M2) interrogation because these 3 interrogations are intended for different targets and, in addition, the associated synchronized replies are of different formats, thus preventing any error in interpretation.

To decrease the size of the selective listening window, the distance of the target may be evaluated on the basis of the power received in the fruits of the target. To this end, on each fruit received from the target, once the azimuth of the latter has been determined, the distance of the target is estimated by computation, while taking into account the antenna gain at the azimuth of the received fruit. This especially allows, in almost real time, targets to be acquired and precisely located even though they are locked to the UF11 all calls of R1 by the radar R2, then these targets to be managed, subsequently, like all the other targets via selective transactions in roll-call (RC) periods.

As the rest of the description will show, the invention has at least the following advantages:
  the invention is based on the very concept of using the II/SI code to determine by which radar mode-S targets are locked: it is therefore applicable provided that a target has a mode-S transponder, no other type of on-board equipment (such as for example an ADS-B system) being required;
  analysis of the fruits of all the targets in the region allows the region of conflict in II/SI code to be defined with greater geographic precision (by virtue of the position of all these targets) and very rapidly even if the number of targets is high;
  analysis of the fruits of a target with the radar R2 allows said target to be pre-located azimuthally;
  selective interrogation in the all calls, with a large tolerance in the distance of this target at the pre-located azimuth, allows it to be detected with precision without affecting the operation performance of the radar R1.

Figure 2:
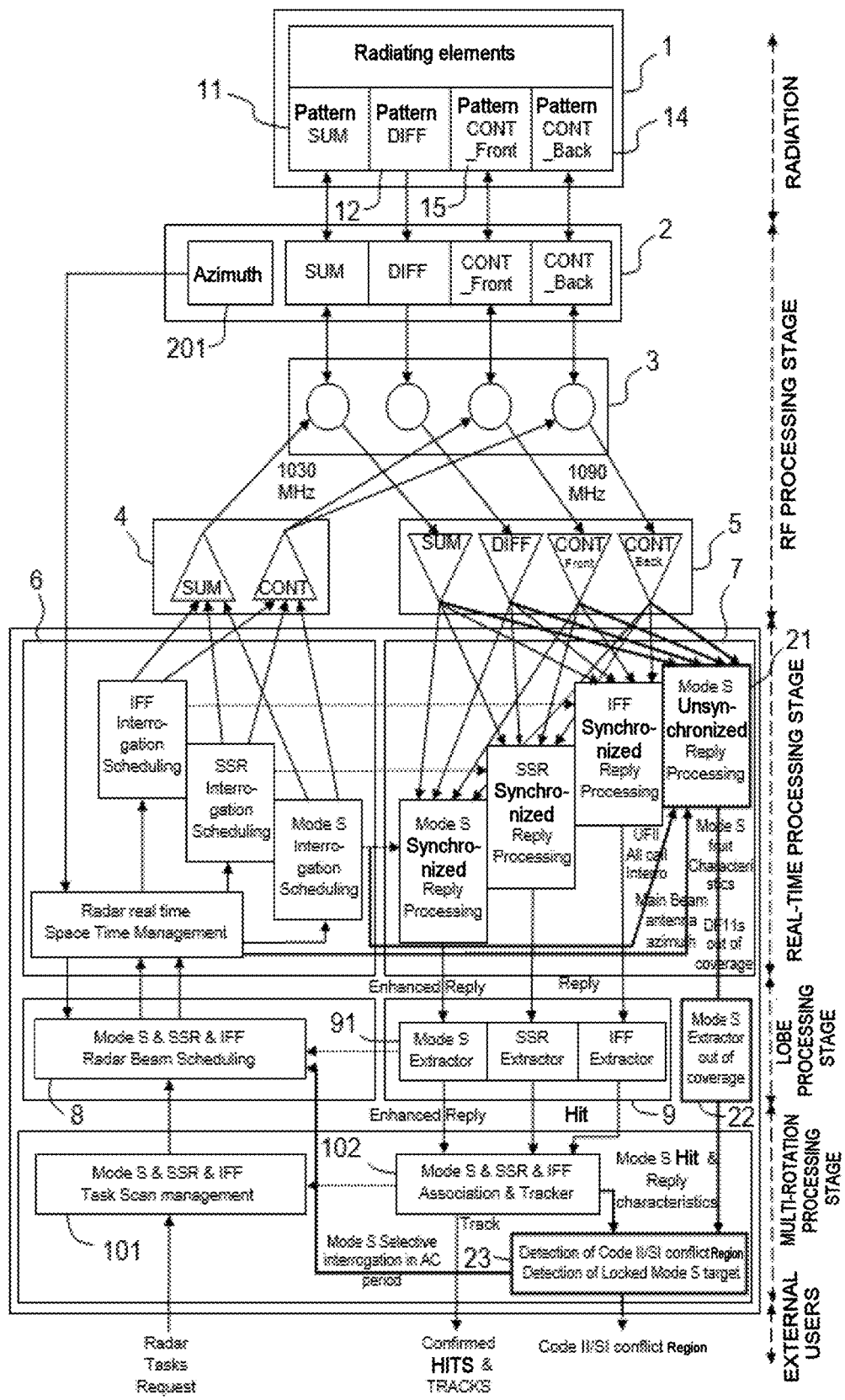
FIG. 2, an exemplary overview of a mode-S radar able to implement the invention.

Let the overview of the mode-S radar presented in FIG. 1 with the changes required to implement the invention now be reconsidered. This new overview, of the radar able to implement the invention, is shown in FIG. 2. The main components and processing operations added according to the invention, applied to a mode-S radar having an antenna with 4 radiation patterns, are shown in thicker lines in FIG. 2.

Whereas the operation of a mode-S radar is synchronized, the processing operations added according to the invention are not associated with transmission and exploit only the azimuthal position of the axis of the main lobe of the antenna. Most of the elements remain unchanged, and as a result:

not only does the invention not affect the operational workings of the mode-S radar;

but also, the same elements are used as those that the radar employs:

with respect to the aerial in the broad sense: antenna, rotary joint, antenna down leads, the duplexers;

with respect to processing: the receiver.

This especially allows correlation of synchronized and unsynchronized replies from the same aeroplanes.

The main functions added are described below.

In the real-time processing stage, and more particular in the processing of the signal:

addition of continuous processing 21 of the unsynchronized mode-S replies (independently of the listening periods associated with the interrogations) ensuring detection and decoding of unsynchronized replies by exploiting separately but also all the 4 radiation patterns SUM, DIFF, CONT_Front and CONT_Back:

to detect all the received replies: unsynchronized and synchronized replies;

to decode replies of any format (DF4/5/11/20/21), the data of the message and above all to extract therefrom the mode-S address;

to enrich each decoded response with its characteristics: detection time, azimuth of the main lobe of the antenna on detection, powers received via SUM, DIFF, CONT_Front and CONT_Back;

enrichment of synchronized replies with the power measured via SUM, DIFF and CONT_Front, and the antenna azimuth;

detection of synchronized replies outside of the operational coverage of the radar.

In the stage of processing the main lobe, the mode-S extractor 22 of DF11 hits generated beyond the operating range is added, the DF11 hits being extracted beyond this range with a view to location and identification of targets via their mode-S address.

In the multi-rotation processing stage:

addition of processing 23 to detect any regions of conflict in II/SI code;

association of fruits (unsynchronized replies) with the synchronized hits of the coverage (operating range and beyond);

geographical analysis of the sources of DF11_R2 fruits (DF11_R2 meaning that the DF11 fruit is an unsynchronized reply the source of which is a radar R2, i.e. an unsynchronized reply not induced by R1, following an all call transmitted by the radar R2);

addition of precise detection and location 23 of targets locked by R2 in the region of conflict in II/SI code:

isolation of the presence of a target not detected by the radar R1 in the region of conflict via analysis of DF4/5/20/21_R2 fruits (DF4/5/20/21_R2 meaning that the fruit is in DF4 format, or DF5 format, or DF20 format, or DF21 format, and generated by a target managed operationally by the radar R2);

evaluation of its azimuthal pre-location with respect to R1 in the region of coverage in conflict;

detection and precise location of this target distancewise and azimuthally, in order to then continue surveillance thereof as for all the other targets.

Figure 3:
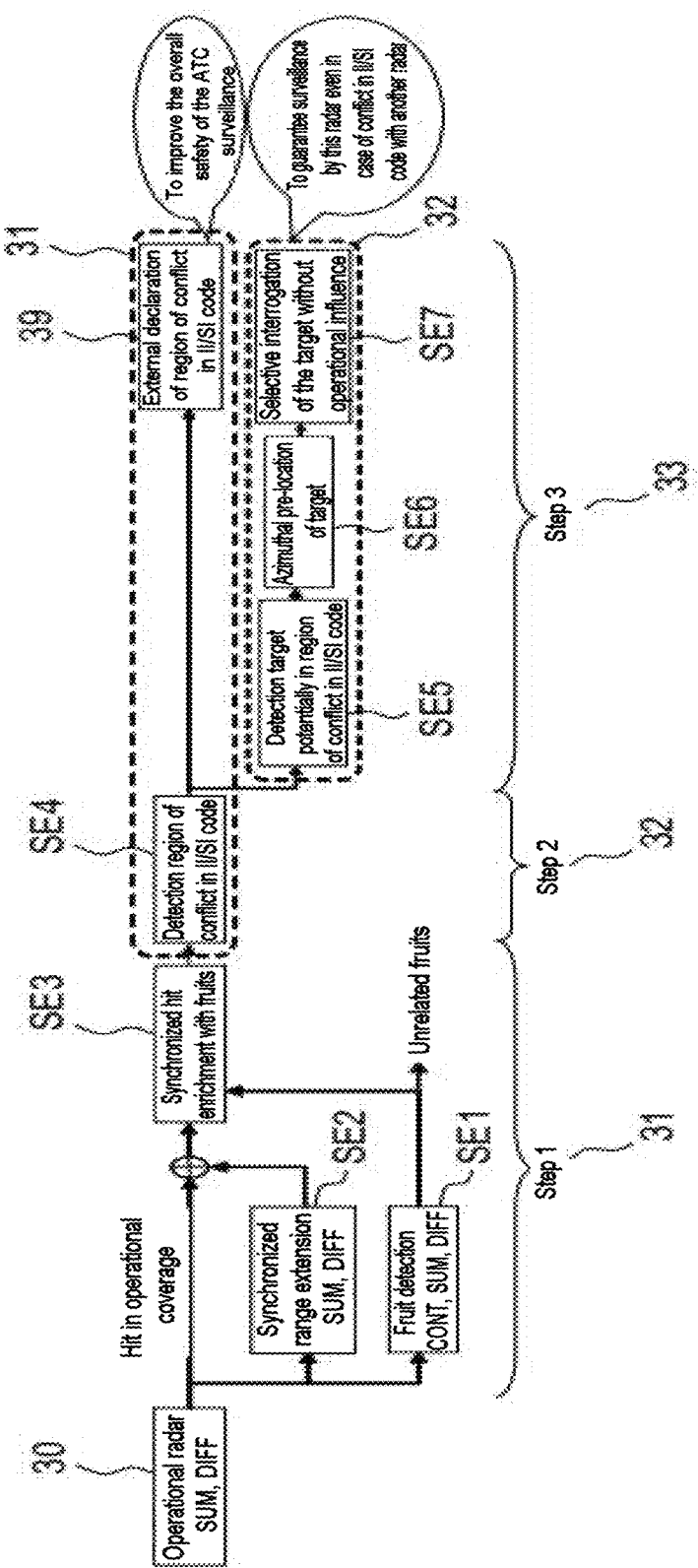
FIG. 3, an illustration of steps that may be used to implement the method according to the invention.

FIG. 3 illustrates the various steps for implementing the invention, these steps being carried out by an operational radar 30. The latter performs its conventional mission of surveillance of the region of (ELS or EHS) operational coverage for which it is responsible, i.e. of detecting and locating all possible mode-S targets via their enriched synchronized replies. The synchronized replies, induced by the radar, are received using azimuthally selective SUM and DIFF radiation patterns. The three possible steps that the invention implements are described below.

The first step 31 comprises three sub-steps SE1, SE2 and SE3. In a first sub-step SE1, the radar 30 detects fruits. These unsynchronized replies not induced by the radar are received via the four radiation patterns SUM, DIFF, CONT_front and CONT_back. According to the invention, the processing carried out by the radar in particular exploits fruits the format of which is identical to that of synchronized replies, both in terms of RF signal and in terms of reply structure.

To exploit the fruits, still in sub-step SE1, a stage of detecting and decoding these unsynchronized replies, which a conventional radar usually rejects, is added to the processing. These unsynchronized replies are qualified with conventional reply attributes, these attributes especially being the following:

detection time;

azimuth of the antenna at the moment of the fruit;

mode-S address of the transmitting transponder;

content of the message;

power of the fruit in each radiation pattern of the antenna.

Depending on the distance of the target to the radar, the fruit may be detected via a plurality of radiation patterns simultaneously. Under these conditions, in this first step, multiple detections (detected at the same time) are concatenated in order to ensure there is only one single unsynchronized reply message per fruit. At this point, it is not possible to distinguish the source of the fruit, which may be:

either induced by another interrogator (another radar, WAM, TCAS, etc.) sharing the same space;

or automatically generated by the target itself (ADS-B, etc.), this eventuality not being exploited by the invention.

In the sub-step SE2, the detection coverage of the radar is extended (knowing that the operational coverage is often set by the user to be less than its guaranteed maximum range) to a much greater, or even its maximum, synchronized detection range, in order to create a measurement region allowing the region of conflict in II/SI code to be defined. The additional synchronized replies thus obtained (with the same radar UF11 all-call operational interrogations, and therefore without affecting the operational workings of the radar) are processed, just like the other synchronized replies of the coverage of the radar in all-call (AC) period, with a view to producing hits, which therefore have the conventional elementary attributes of a basic mode-S hit, such as in particular:

detection time of the hit centre;

mode-S address of the transmitting transponder;

azimuth of the hit centre;

distance of the hit;

for each reply from which the hit is formed:

detection time (conventionally of the order of 50 ns)

azimuth of the antenna;

success or failure of the interrogation (response received or not);

pointing error in the lobe;

content of the message;

power of the reply in each radiation pattern of the antenna (SUM, DIFF and CONT_Front).

In the sub-step SE3, the fruits are associated with the mode-S hits of the extended coverage of the radar. With each target located, in the extended or operational space of coverage of the radar, by the radar via selective interrogations that generated synchronized (DF4/5/11/20/21) replies, the invention associates the fruits that it generated (on the basis of the unique mode-S address of the transponder used as target identifier):

either between two successive synchronized detections in mode S (close to one rotation);

or on a rotation basis, for example.

Since the fruit is by nature unsynchronized, the position of the target at the moment of the detection of the fruit is determined by interpolating the position of the target on the basis of its trajectory, which is determined by the radar, as part of its operational functions, at the time of reception of the fruit.

Figure 7:
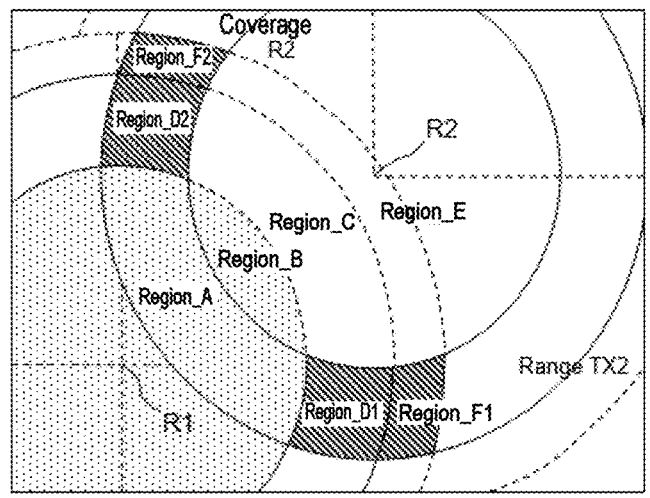
FIG. 7, an illustration of division of a region of overlap into a plurality of sub-regions depending on the replies that the targets generate with the 2 radars.

In the second step 32, the radar detects and characterizes a region of potential conflict in II/SI code by analysing various geographic regions between the two radars. This operation corresponds to a sub-step SE4 in which the radar carries out this detection and characterization by analysing, for various geographic regions between the two radars:

the presence of DF11 fruits of targets in two regions D1 and D2 flanking the region of conflict in II/SI code (regions D1 and D2 in FIG. 7);

the absence of DF11 fruits from targets in non-overlapping region A of operational coverage of the radar R2 (region A in FIG. 7);

the II/SI code associated with fruits identical to those of the radar R1 in the regions D1 and D2;

the absence of synchronized DF11 hits beyond the operational coverage of the radar in a region C (region C of FIG. 7).

In case of confirmation of a conflict in II/SI code, the region in question is transmitted by the radar to the ATM supervisor with a view to having the problem corrected.

The third step 33 comprises at least three sub-steps SE5, SE6 and SE7. In this step, to guarantee the safety of the surveillance of the radar (indispensable in ATC), in case of detection of any conflicts in II/SI code, the invention allows:

the presence of a target not detected by the radar in the region of conflict to be isolated;

the azimuthal pre-location of this target in the region of conflict to be evaluated;

this target to be detected and precisely located distance-wise and azimuthally, in order allow surveillance thereof just as for all the other targets.

In sub-step SE5, the radar isolates the presence of an undetected target in the region of conflict (in case of detection of conflict in II/SI code). To this end, to detect the presence of a target potentially locked by another radar R2 in the region of conflict in II/Si code (region B or C in FIG. 7) the radar firstly isolates, among all the captured fruits, DF4/5/20/21 fruits due to the other radar R2 (i.e. fruits caused by the latter during its operational interactions with the targets) the mode-S address of which is as yet unknown to R1.

Therefore, a target, referenced by its mode-S address, some of the DF4/5/20/21 fruits of which are:

temporally between DF11_R2 fruits of targets known to R1 in the regions D1 and D2, and temporally synchronized, between the DF11_R2 fruits of the regions D1 and D2, over P rotations of R1 (about ten rotations for example), is a potentially locked target in the region B or C, certain fruits of which are caused by this other radar R2 (these regions will be defined below).

The criterion of synchronization between the fruits of the target and the fruits of each target in D1 and D2 takes into account a tolerance with respect to the time difference between these fruits, allowing for the known azimuthal variation of the targets in D1 and D2 over the P rotations and the unknown position of the interrogation thereof in the lobe of R2.

As a target generates fruits with different radars, this temporal selection allows only those due to R2 of a target in region B or C to be selected.

In the sub-step SE6, the radar pre-locates the target in the region of conflict in II/SI code azimuthally. More precisely, the radar evaluates the azimuthal pre-location of an isolated target in the region of conflict by exploiting the absolute value of the time difference between the fruits of the target under analysis and the fruits of known targets in the regions D1 and D2. Considering the speed of rotation of R2 to remain stable and targets in D1 and D2 to be located in azimuth and distance by R1 on each turn, this makes it possible to estimate, on each rotation, an azimuth of the target via an analysis based on simple interpolation, using the time of detection of the fruits by R1, and to do so over the P rotations of the preceding temporal analysis (or more, depending on the desired precision). On each rotation, each pair consisting of a fruit of the target and a fruit of a known target of D1 or D2 allows azimuth to be estimated. The azimuthal pre-location of the target is the average of these estimations.

In the sub-step SE7, the invention performs, via R1, the detection of azimuthal position and the computation of the distance of the target locked by R2, in order to then continue surveillance as with all the other targets. To this end, the additional selective interrogation for this mode-S address of which is known via its fruits is positioned in the AC period (which is usually intended for non-selective all-call interrogations) and therefore the operation workings of the selective surveillance of known targets via the roll-call (RC) interrogations is not modified. Specifically, since the distance of this target is as yet not precisely known, the associated listening window is large in size and if it were employed in an RC period it would occupy about half of the time of the sequence, to the detriment therefore of the other targets to be managed (regions A and B).

In the process illustrated in FIG. 3, the sub-step SE4 of detecting conflict in II/SI code, which sub-step is followed by an external declaration 39, of warning type, indicating the region of conflict in code, forms a first processing stage 31 allowing the overall safety of the ATC surveillance to be improved. Sub-steps SE5, SE6 and SE7 form a second processing stage 32 allowing surveillance by the radar 30 to be guaranteed even in the case of a conflict in II/SI code, this surveillance being guaranteed via the detection and location of aeroplanes in the region of conflict in II/SI code.

The context and the phases of the invention, which were introduced above, will now be described in more detail. To start with, the context of the fruits received by a secondary radar will be recalled. These fruits are always generated by real targets and mainly those in the electromagnetic coverage of the secondary radar.

Figure 4:
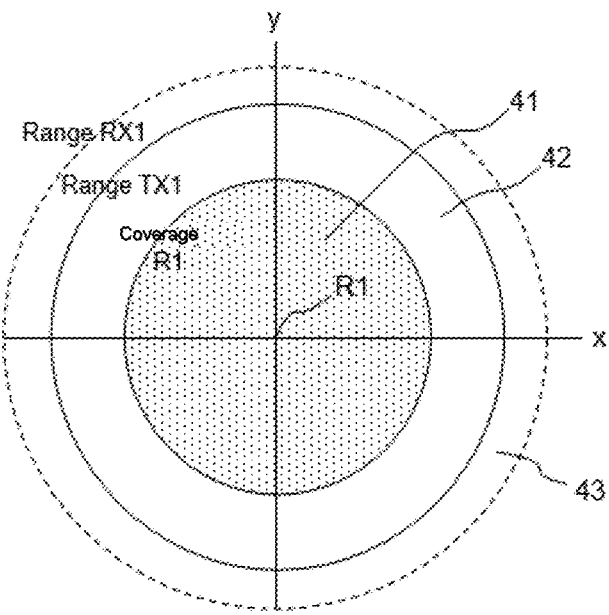
FIG. 4, an illustration of the operational range and the extended range of a secondary radar at a given altitude.

FIG. 4 illustrates the various ranges of the radar in an XY-plane. To guarantee its surveillance role in a given region, the region of coverage 41 of a secondary radar, denoted R1 below, usually incorporates a transmission margin in order to guarantee a probability of detection higher than 99%. In this region 41, a target equipped with a transponder at the lower limits of sensitivity at 1030 MHz may correctly interpret the mode-S interrogation, and a transponder at the lower limits of power at 1090 MHz may be correctly detected by the radar. As a result, targets that have a transponder that is more centred in the dispersions of sensitivity at 1030 MHz and of power at 1090 MHz, or that is even at the top end thereof, is still able to correctly interpret (and therefore respond) at a maximum range much larger than this region 41. Thus, a larger region 42 in which most targets are still capable of responding to interrogations is obtained. In addition, a radar must detect synchronized replies at 1090 MHz that it induced via its interrogations at 1030 MHz. Therefore, its reception range is often in practice much greater than the maximum transmission range, leading to a reception region 43 that encompasses the preceding regions 41, 42. The transmission range corresponding to the limit of the region 42 and the reception range corresponding to the limit of the region 43 will be denoted Range_TX and Range_RX below, respectively. The secondary radar in question is denoted R1, it is located at the centre of the region 41 and its transmission and reception ranges are denoted Range_TX1 and Range_RX1 with reference to this radar R1, respectively. Moreover, radar operators often employ the latter with ranges that are often less than the guaranteed electromagnetic ranges, and therefore, with respect to locking targets, with an operational coverage of a radius smaller than 41, mainly for reasons due to limits on the visibility of targets from the radar site.

Figure 5:
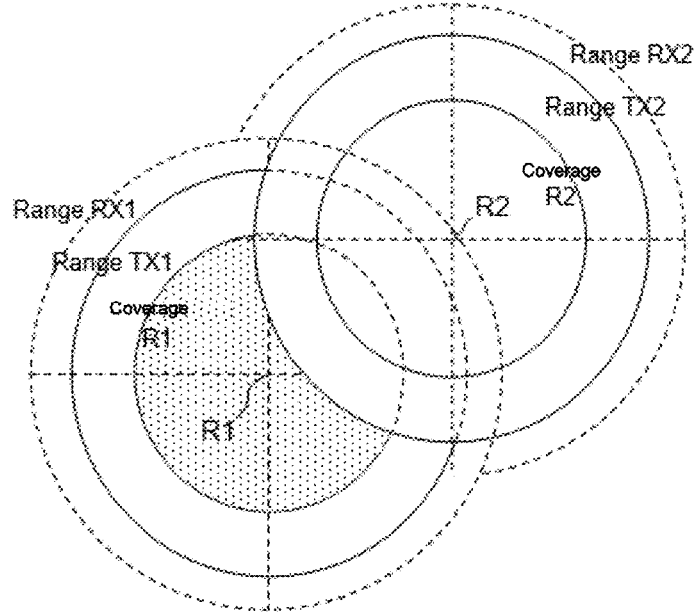
FIG. 5, an illustration of the overlap of ranges of two secondary radars.

FIG. 5 illustrates a two-radar configuration, a second radar R2 being located in the vicinity of the radar R1. More precisely, FIG. 5 illustrates the overlap of the regions of coverage between the two radars. The analysis carried out in the rest of the description is given from the point of view of the radar R1, a reciprocal analysis being possible from the point of view of radar R2. The radar R2 interrogates targets in the coverage of R1 up to the limits of its transmission range Range_TX2.

Figure 6A:
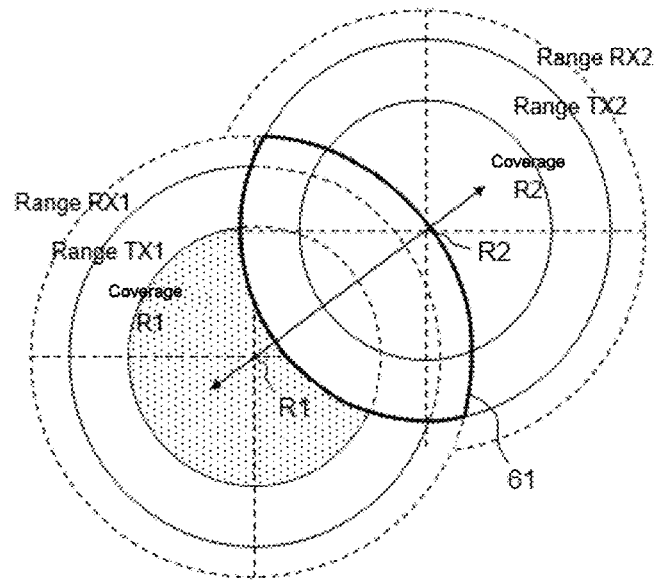
FIG. 6a, an illustration of electromagnetic impingement of a nearby radar on a reference radar.
Figure 6B:
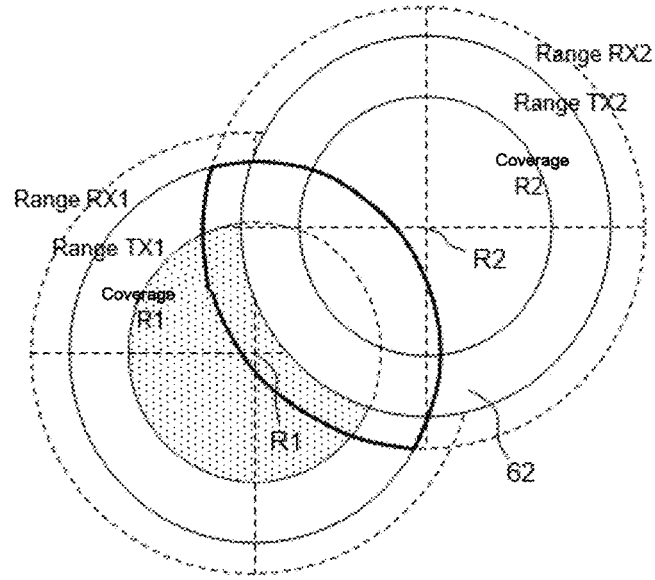
FIG. 6b, conversely, an illustration of electromagnetic impingement of the reference radar on the nearby radar.

FIGS. 6a and 6b show the regions of impingement between the two radars R1, R2. FIG. 6a shows the volume of impingement of R2 on R1 corresponding to region 61. FIG. 6b shows the impingement of R1 on R2 corresponding to the region 62.

As FIG. 7 shows, the region of overlap between two radars (here in the case of impingement of R2 on R1) is divided into various sub-regions A, B, C, D1/D2, E, F1/F2 depending on the type of message that each radar exchanges with the targets of the sub-region. The principle of the invention consists in analysing in detail the presence or absence of this type of message to define these sub-regions azimuthally, as with the device described in patent application FR 1800914. In the present invention, the aim is to detect the conflicts in II/SI code. The formats of the replies exchanged between a radar and the transponder of an aeroplane are known to those skilled in the art. The type of reply depends both on the radar and on the task that has been attributed thereto in the radar region in which the target is located.

The region in question in case of conflict in II/SI code is the region B in which, if a target is inbound toward R1 from the coverage of R2 (regions E, C, B) it is not detected by R1 before region A because, in region B, being locked by R2, it does not respond to the all calls (DF11) of R1, which therefore does not see it.

Table 1 below collates, for an example of usual operation of mode-S radars with different II/SI codes (II1 for R1 and II2 for R2), the respective tasks of R1 and R2 in a given region.

TABLE 1

| Sub-region | Radar R1 (II1) | Radar R2 (II2) | Reply synchronized with R1 | Reply unsynchronized with R1 (due to R2) |
|---|---|---|---|---|
| Region_A | Target under surveillance Locked to II1 | Target not under surveillance Non Locked to II2 | DF4, DF5, DF20, DF21 | DF11 |
| Region_B | Target under surveillance Locked to II1 | Target under surveillance Locked to II2 | DF4, DF5, DF20, DF21 | DF4, DF5, DF20, DF21 |
| Region_C | Target not under surveillance Non Locked to II1 | Target under surveillance Locked to II2 | DF11 | DF4, DF5, DF20, DF21 |
| Region_D1/D2 | Target not under surveillance Not locked to II1 | Target not under surveillance Not locked to II2 | DF11 | DF11 |
| Region_E | No synchronized reply | Target under surveillance Locked to II2 | — | DF4, DF5, DF20, DF21 |
| Region_F1/F2 | No synchronized reply | Target not under surveillance Not locked to II2 | — | DF11 |

Figure 8:
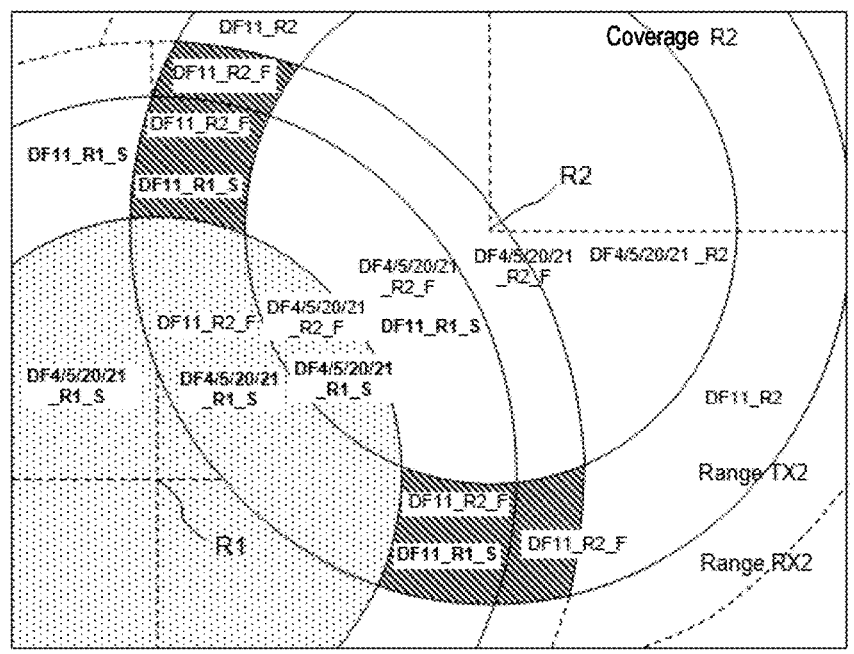
FIG. 8, a presentation of the replies sent by targets to the radars R1 and R2 in the region of overlap by sub-region.

FIG. 8 shows, for different II/SI codes, the types of reply by sub-region. More particularly, it shows the messages exchanged in the region of overlap depending on the sub-region in relation to Table 1 above. Replies that are synchronized with R1 have been emboldened and replies that are unsynchronized with R1 have not been emboldened, the latter being fruits due to R2. Furthermore, whether a reply is synchronized or a fruit has been indicated by the extensions S and F, respectively.

Table 2 below collates the respective tasks of R1 and R2 for targets belonging to given sub-regions in the case of use of the same II/SI code by both radars, this code being denoted IIc.

TABLE 2

| Sub-region | Radar R1 (II1) | Radar R2 (II2) | Reply synchronized with R1 | Reply unsynchronized with R1 (due to R2) |
|---|---|---|---|---|
| Region_A | Target under surveillance Locked to IIc | Target not under surveillance Not locked to IIc | DF4, DF5, DF20, DF21 | ~~DF11F~~ the radar R1 locks aeroplanes to IIc |
| Region_B | Target under surveillance Locked to IIc | Target under surveillance Locked to IIc | DF4, DF5, DF20, DF21 Region of conflict in II/SI code | DF4, DF5, DF20, DF21 Region of conflict in II/SI code |
| Region_C | Target not under surveillance Non Locked to IIc | Target under surveillance Locked to IIc | ~~DF11F~~ ▶the radar R2 locks aeroplanes to IIc | DF4, DF5, DF20, DF21 |
| Region_D1/D2 | Target not under surveillance Not locked to IIc | Target not under surveillance Not locked to IIc | DF11S ▶tj R1 hit present because R2 does not lock (to IIc) | DF11F ▶tj R2 fruit present because R1 does not lock (to IIc) |
| Region_E | No synchronized reply | Target under surveillance Locked to IIc | — | DF4, DF5, DF20, DF21 |
| Region_F1/F2 | No synchronized reply | Target not under surveillance Not locked to IIc | — | DF11 |

Figure 9:
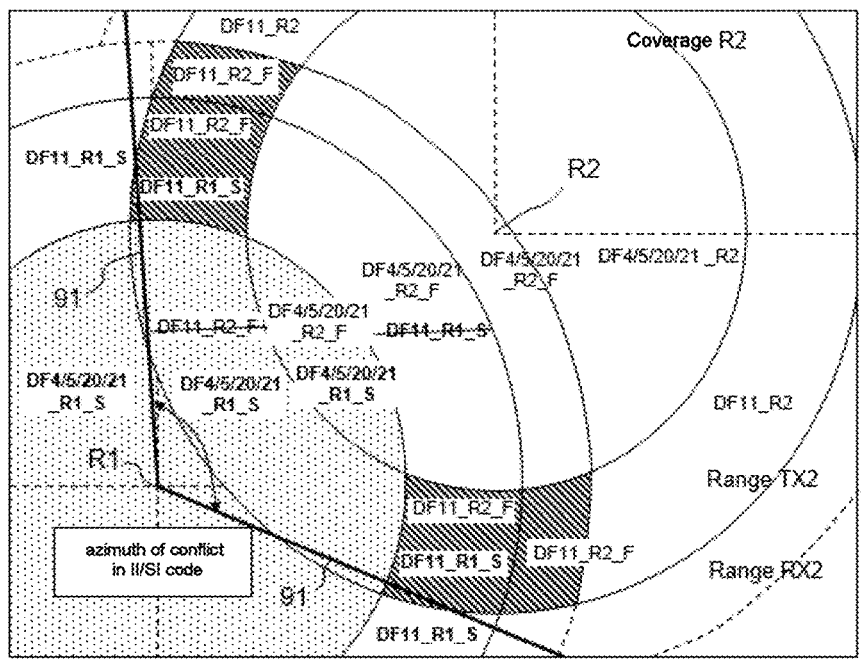
FIG. 9, a presentation of the azimuthal region of conflict in the II/SI code of the radar R1 depending on the replies sent in the region of overlap by sub-region.

FIG. 9 shows, for the same II/SI code, the types of replies by sub-region. More particularly, it shows the messages exchanged in the region of overlap depending on the sub-region in relation to Table 2. Characters in bold indicate DF11 fruits that disappear in the case of the same II/SI code (IIc). Characters not in bold indicate synchronized and unsynchronized replies that are still present. The distribution of the DF11 replies to the all calls of each radar has changed with respect to FIG. 8, as a result of the use of the same II/SI code (IIc) by the radars R1 and R2:

- in sub-regions D1 and D2, replies synchronized with R1 and unsynchronized with R2 are still present; in addition they use the same code IIc,
- in sub-region A, targets in the coverage or R1 do not generate any fruit DF11 with R2;
- in sub-region C, targets outbound from the coverage (sub-region B) of R1 no longer reply to the all calls of R1 even though R1 is no longer locking them.

Table 3 below collates, for R1, the differences between sub-regions in the case of conflict in II/SI code and in the absence of conflict.

TABLE 3

| REGION | Different Il/SI codes | | | Identical Il/SI codes | | | Observations |
|---|---|---|---|---|---|---|---|
| | Hit in coverage | Hit out of coverage | Fruits | Hit in coverage | Hit out of coverage | Fruits | |
| A | Yes | | DF11_R2 | Yes | | 0 | The aeroplanes managed by R1 no longer generate fruit with R2 |
| B | Yes outbound range = inbound range | | DF4_R2, DF5_R2, DF20_R2, DF21_R2 | Yes outbound range = inbound range | | DF4_R2, DF5_R2, DF20_R2, DF21_R2 | The maximum range of outbound targets exiting coverage (known in A) is > than that of inbound targets because not seen in B |
| C | | Yes outbound range = inbound range | DF4_R2, DF5_R2, DF20_R2, DF21_R2 | | 0 | DF4_R2, DF5_R2, DF20_R2, DF21_R2 | Outbound hits exiting the operational coverage B of R1 to C no longer generate synchronized DF11_R1 hits |
| D | | Yes outbound range = inbound range | DF11_R2 | | Yes outbound range = inbound range | DF11_R2 | The fruits of R2 have the same II/SI code as R1 (IIc) |

Depending on the spatial distribution of aeroplanes between the four sub-regions 1 to 4, criteria may be met:

- regions D1 and D2: presence of R1 hits generating fruits of same IIc code with R2;
- region C: hits of R1 outbound from region B do not reply to the all-calls (UF11) of R1,
- region A; the hits of R1 generate no fruit of code IIc, which is the identifier of R2;

inbound hits are not seen by R1 in region B, they appear in AC only in region A: outbound range>inbound range.

Following this analysis, the radar R1 considers there to be a presumption of conflict in II/SI code in an azimuthal region comprised between the two regions D1 and D2, this region being diagrammatically bounded by the two straight lines 91 and 92 in FIG. 9. In practice, the position of these straight lines is obtained by drawing a straight line through the radar R1 and:
  in D1: the target of R1 generating fruits of same code IIc having, seen from R1, the largest azimuth;
  in D2: the target of R1 generating fruits of same code IIc having, seen from R1, the smallest azimuth.

Figure 10A:
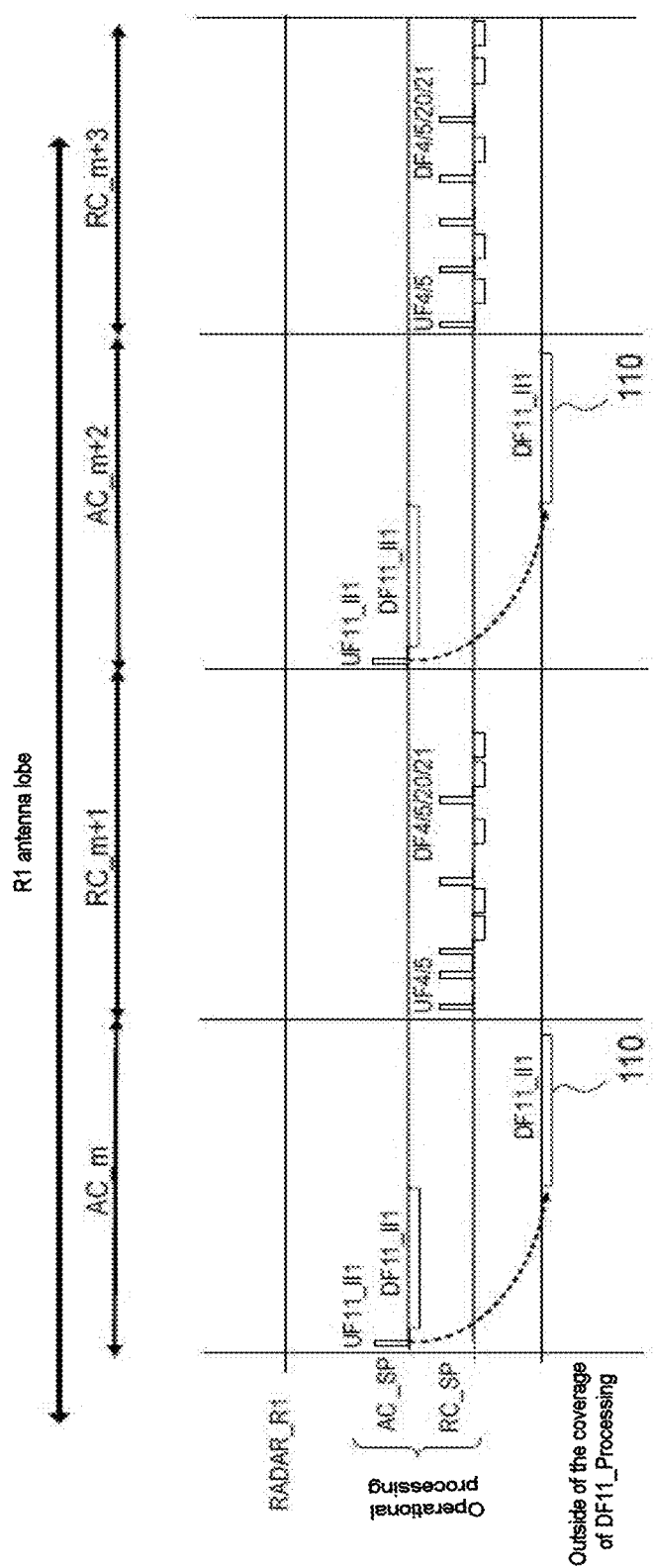
FIG. 10a, an illustration of the detection of DF11 hits outside of the operational coverage of the reference radar, achieved by increasing the duration of the all-call (AC) periods.
Figure 10B:
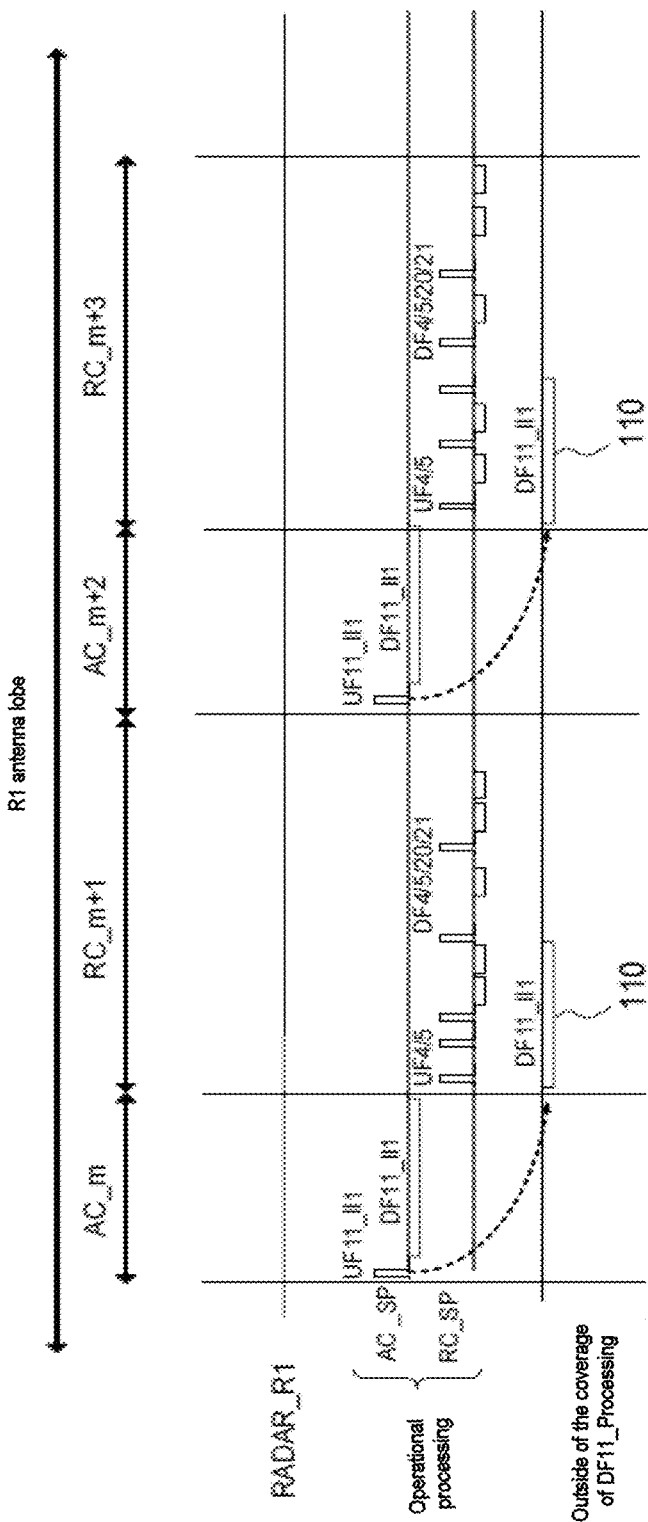
FIG. 10b, an illustration of the detection of DF11 hits outside of the operational coverage of the reference radar, in parallel with the following period, and achieved without increasing the duration of the AC periods.

With reference to FIG. 10*a* or FIG. 10*b*, which illustrate the detection of DF11 hits outside of radar operational coverage, the specific processing of the fruits, carried out to confirm the azimuth of conflict in II/SI code, will now be described. In order to detect and define the azimuth of the conflict in II/SI code, it is necessary, in the radar R1, to process its synchronized replies from the two regions D1 and D2 without interfering with the operational workings of the radar.

In its operational workings, the radar manages two types of periods for aeroplanes in its coverage (regions A and B):
  all-call (AC) periods, for detecting inbound aeroplanes in mode S:
    mode-S radar beam management places a general UF11 interrogation call in each AC;
    mode-S reply processing detects DF11 replies in the operational range of the radar;
    mode-S extractor constructs a DF11 mode-S hit again in the operational range of the radar;
  roll-call (RC) periods, for ensuring the surveillance (ELS or EHS) of aeroplanes in mode S:
    mode-S radar beam management selectively interrogates in turn aeroplanes previously detected in AC via UF4/5/20/21 requests;
    mode-S reply processing detects DF4/5/20/21 replies in the operational range of the radar;
    mode-S extractor constructs an enriched mode-S hit again in the operational range of the radar;
    then the radar locks the target thus acquired in RC so that it no longer replies to the all calls of this radar, and therefore to its identifier, namely its II/SI code.

In the present invention, the mode-S function in the processing 21 of the unsynchronized replies references all the DF11 fruits with the code II1 of R1 that are received after the last UF11 interrogation of the AC periods of the radar of R1 even if they come from beyond the operational range of the radar. Two approaches are possible, as shown:
  in FIG. 10*a* (increase of the duration of the AC periods);
  and in FIG. 10*b* (the period in which synchronized DF11 replies are listened for is located outside of the AC period, in the RC period).

Both solutions allow the DF11-extraction function 22 to construct synchronized DF11 hits outside operational coverage (outside the conventional listening phase of the AC period) and therefore for regions D1, C and D2. FIGS. 10*a* and 10*b* thus feature an additional listening phase 110 outside of the operational AC listening period (this is not an operational requirement of prior-art radars) and this phase therefore does not disrupt the operational workings of the radar in the case of FIG. 10*b*. This additional listening phase is performed for the region 42 (see FIG. 4). It will therefore be noted that synchronized DF11 replies in the operational coverage of the radar are not processed by this new function 22 since they are already exploited by the operational workings of the radar in AC.

The duration of this additional phase of listening for DF11 replies is in fact limited only by the duration of the RC period, since it runs in parallel to this period before the next AC period in the case of FIG. 10*b*. In practice, since the duration of an RC period is about 1.5 to 2 times that of an AC period, it is therefore possible to listen for replies from a distance must larger than twice the operational range. Therefore, the maximum listening range is in practice limited only by the electromagnetic range.

Figure 11:
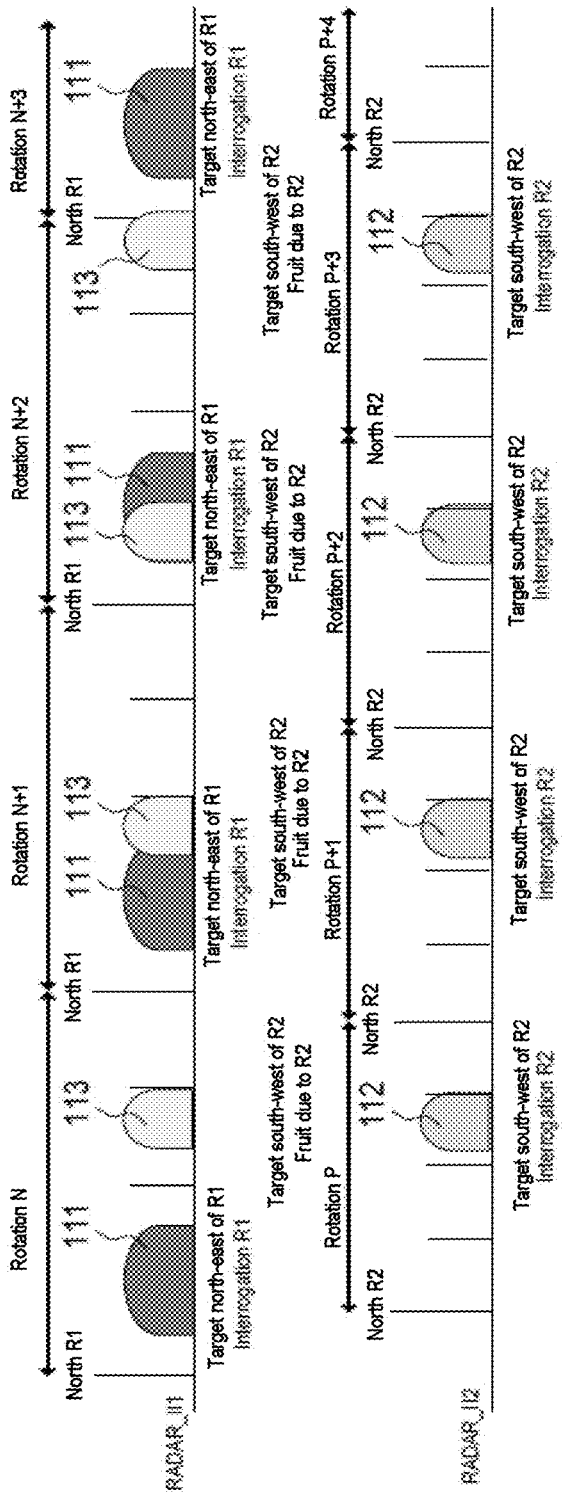
FIG. 11, an illustration of the unsynchronized nature of fruits due to a nearby radar.

With reference to FIG. 11, the search for targets in region B via a temporal approach to the targets will now be described. For this temporal approach, the radars will be assumed to be mechanically rotated antennas, this assumption holding true for the vast majority of ATC radars. FIG. 11 shows, by way of example, in the form of a simplified diagram, the case for the preceding radars R1 and R2 when all of the targets in the region of common RF coverage are:
  to the north-east of the radar R1,
  to the south-west of the radar R2.

The additional assumption also being made (in this example) of a period of rotation of the antenna of R2 of about ¾ of that of R1.

FIG. 11 shows replies 111 synchronized with R1 and replies 112 synchronized with R2, and the replies 113 unsynchronized with R1 (the fruits) of targets in this common region. Because of the natural movement between two antenna rotations, it may be seen that the fruits due to R2 are also unsynchronized azimuthally with respect to R1, which may nevertheless timestamp the fruits with precision with a view to computing their azimuth subsequently.

The principle that the invention uses to detect the presence of a target locked by R2 potentially in the region B requires, first, among all the fruits captured by R1, the DF4/5/20/21 fruits due to the radar R2, which the latter induces during its operational interactions with targets including those in region B or C, to be isolated. It will be noted that the DF4/5/20/21 messages do not contain the identifier of R2 but solely the mode-S address of the target, and that therefore they do not themselves identify the radar that induced them: they solely allow the target to be identified.

Figure 12:
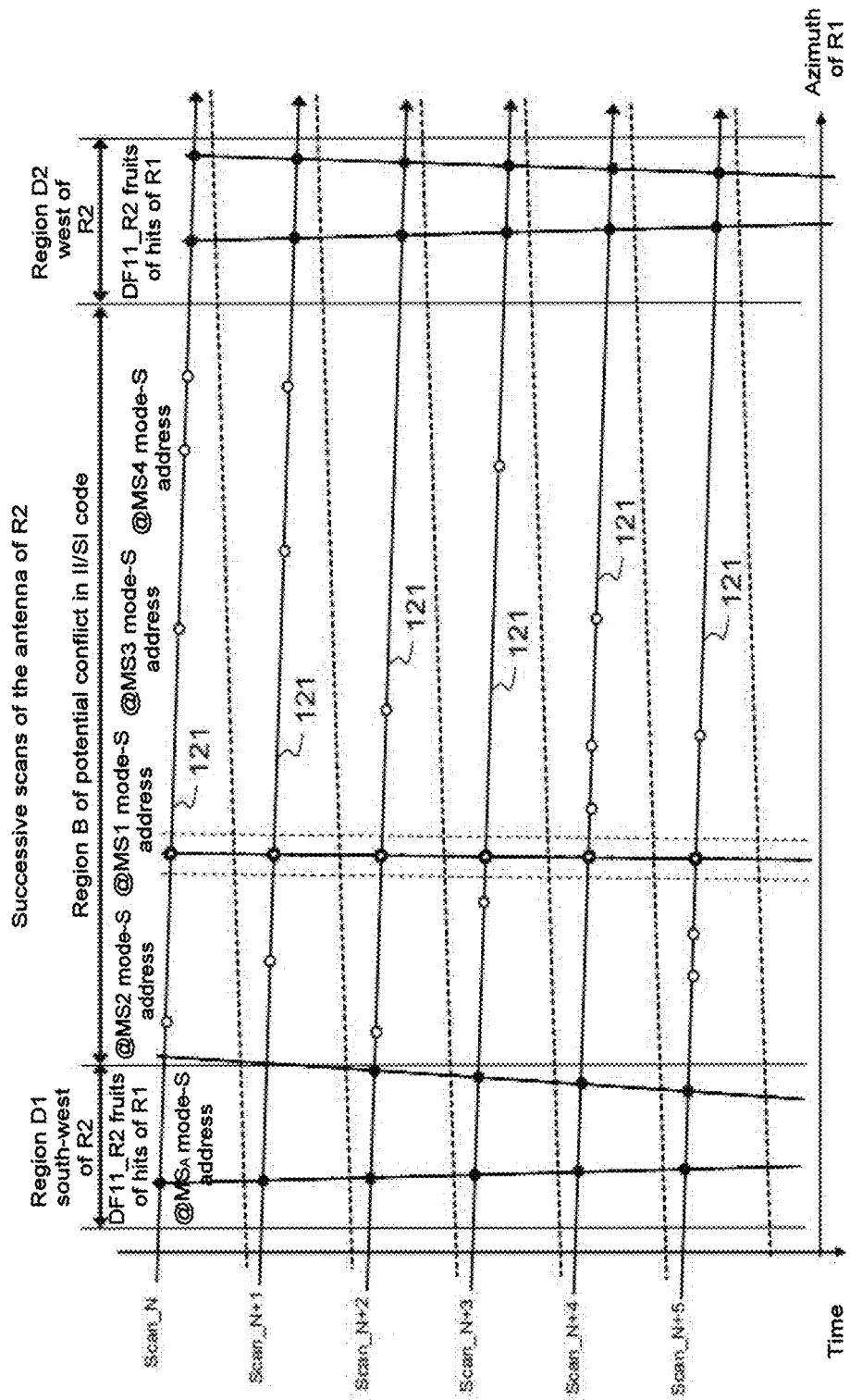
FIG. 12, an illustration of the search for and pre-location of targets in a region of conflict in II/SI code via temporal and azimuthal analysis of the fruits caused by the nearby radar.

To achieve this isolation, as shown in FIG. 12, the invention exploits the fact that the fruits of R2 are almost synchronous with one another from one rotation of the antenna R2 to the next.

The preceding analysis has allowed R1 to locate targets generating DF11 fruits due to R2 (according to its identifier) in the regions D1, south-east of R1 (south-west of R2), and D2, north-east of R1 (west of R2), in the example of FIG. 9.

The following step of the analysis consists in searching for DF4/5/20/21 fruits synchronous with these DF11 fruits of R2 by analysing, over a plurality of rotations, those fruits the time difference of which, with respect to the fruits of the targets or regions D1 and D2, remains almost constant when the movement of these targets is taken into account (R1 may compute this movement since these targets generate hits synchronized with R1 outside of operational coverage).

Therefore, these DF4/5/20/21 fruits, which are:
  temporally between DF11_R2 fruits of targets known to R1 in the regions D1 and D2 from one rotation to the next,
  and temporally synchronous, between the fruits DF11_R2 of the regions D1 and D2, over P rotations of R1 (about ten rotations—parameter of the invention), are due to targets potentially in the regions B and C and are induced by R2.

FIG. 12 illustrates, along the time axis and in the azimuth of R1, the successive scans by the antenna of R2, starting with a scan N (referenced scan_N), the figure illustrating successive temporal zooms in on the passage of the antenna of R2 from the region "D1 south-west of R2" to the region "D2 west of R2" and therefore through the regions B and C. The dashed lines illustrate the rest of the rotation of the antenna of R2 to the other azimuths of R2 on a time scale that has been decreased intentionally to highlight the zoomed portions.

In the regions "D1 south-west of R2" and "D2 west of R2", only targets transmitting DF11_R2 fruits induced by R2 have been shown (by solid circles).

In the central time period between the regions D1 and D2, the DF4/5/20/21 fruits that R1 captures are of two types. The radar according to the invention analyses these fruits target by target (mode-S address available in the DF4/5/20/21 messages) to determine, on each rotation, their time difference with respect to the DF11_R2 fruits of the two regions D1 and D2:
- fruits induced by R2 for targets in region B or C remain almost stable with respect to the DF11 fruits of R2 since they are induced by the same radar (fruits represented by emboldened circles);
- fruits induced by other radars, for targets at any azimuth, which R1 will nevertheless detect via its omnidirectional antenna (radiation pattern CONT), are not stable as a function of time with respect to the fruits of R2 after differences in rotation of the antennas of these radars and R2 are allowed for (fruits represented by circles that have not been emboldened).

In FIG. 12, the target represented by the emboldened circles, of mode-S address MS1 (@MS1), which remains stable (to with a parameterizable temporal tolerance ΔT) with respect to the DF11_R2 fruits (@$MS_A$ of D1 and @$MS_B$ of D2) for an analysis over a depth of P (parameter) rotations, is considered to be in region B or C. The analysis of FIG. 12 therefore allows the fruits to be positioned with respect to one another.

To pre-locate a potentially locked target azimuthally as being in region B, without replying to the UF11 all calls of R1, at least two methods may be used: azimuthal pre-location via time difference or azimuthal pre-location via use of antenna radiation pattern.

For the azimuthal pre-location, it will be noted that, in the preceding step, the stability of the time difference between the fruits of the target of address MS1 (@MS1) and the DF11_R2 fruits of the regions D1 and D2 are used to isolate whether it belongs to region B or C. Now, the radar R1 knows the azimuthal position, in its frame of reference, of targets in regions D1 and D2 that have generated DF11 R2 fruits.

The absolute value of the time difference of the target under analysis (@MS1) with respect to each target (@$MS_A$ and @$MS_B$) of the regions D allows an azimuth of the target @MS1 to be estimated on each rotation of the P rotations of the preceding analysis (or more depending on the desired precision). The azimuthal pre-location of the target @MS1 in a given rotation is the average of these estimations. A linear regression over P rotations allows both the azimuth to be refined and in addition an angular speed of the target with respect to R1 to be evaluated.

The principle of the other way in which an azimuthal pre-location may be determined, i.e. using the radiation pattern of the antenna, is especially described in patent application FR1800657.

Once a locked target potentially in region B has been located azimuthally, it remains to locate it distancewise. In the rest of the preceding example, the target @MS1 will be considered. This target @MS1 to be located distancewise with respect to R1:
- is not in region A because if it were it would have replied to the UF11 interrogation of R1,
- is potentially in region B and therefore in the region for which R1 is responsible (in this case it must be detected);
- is potentially in region C and therefore outside of the region for which R1 is responsible (in this case it not necessary to detect it).

It is necessary to search for the target @MS1 beyond the maximum distance of the region A and below the minimum distance of the region B. The target @MS1 may be detected and precisely positioned using at least two methods:
- either by exploiting a functionality of the mode-S protocol;
- or by exploiting a selective interrogation of the region-B target.

The mode-S protocol makes provision, in case of conflict in II/SI code, to force unlocking of targets that receive a UF11 all-call interrogation, forcing a locked transponder to reply to the II/SI code of the UF11 request. This approach not only:
- creates a lot of clutter, since all those targets in region A and in region B that the radar R1 is already aware of and that are either at the azimuth of the transmission of the UF11 call or covered by the azimuthal width of the lobe of the transmitting antenna (EBW_TX close to 6°) will reply;

but also is not always effective, because all these mode-S responses will also overlap:
if the number of targets is high in this azimuthal direction;
or even simply if a target is close distancewise to @MS1, hence @MS1 will have a high probability of not being detected on the 1st attempt and a number of attempts over a number of rotations, each time inducing a number of needless replies from already known targets, will be required.

Figure 13:
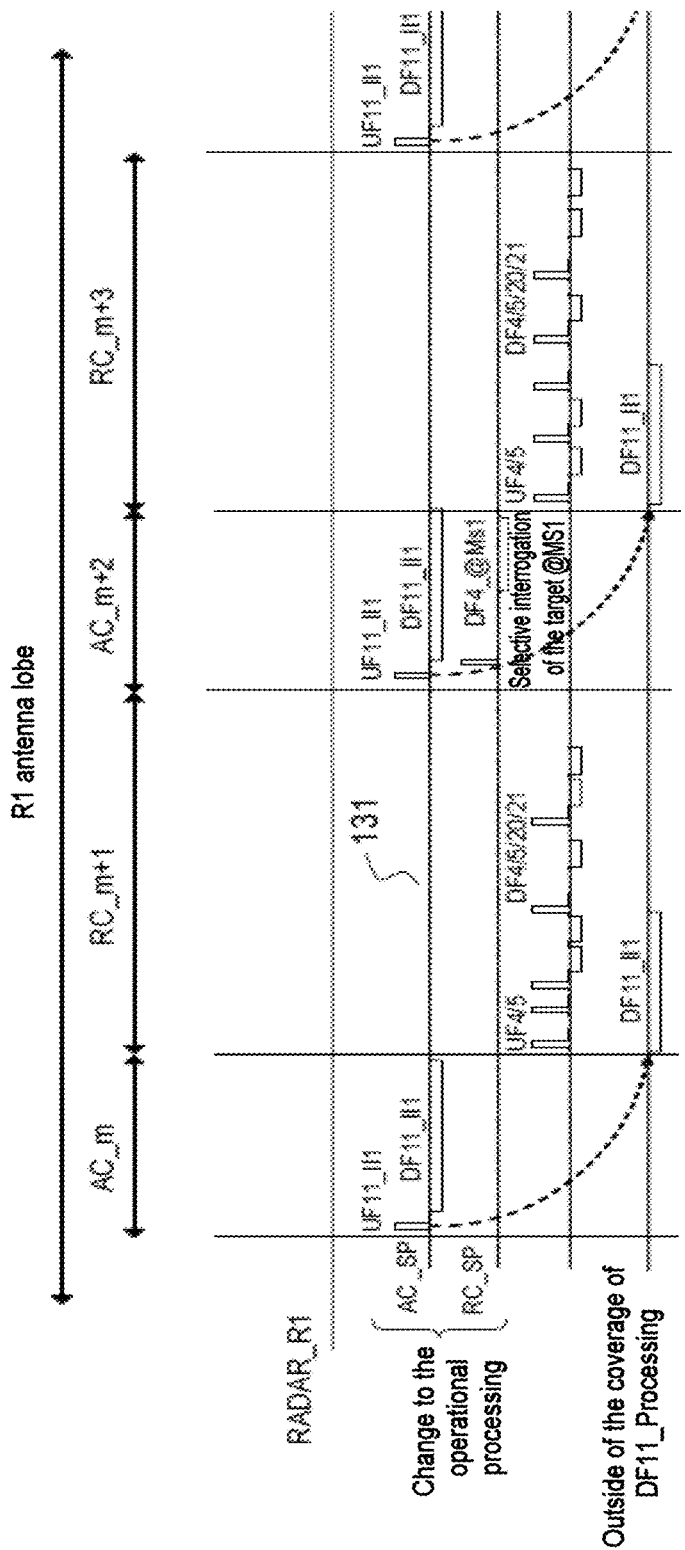
FIG. 13, an illustration of the detection of locked targets without disruption to the operation of the reference radar.

In the other method, illustrated in FIG. 13, to prevent replies from targets in region A or in region B that are already known, the target @MS1 is selectively interrogated at its pre-located azimuth. As FIG. 13 shows, the selective interrogation, which is selective to the target of mode-S address MS1, is positioned in the AC period (which is usually intended for unselective all-call interrogations), and therefore the operational workings of the selective surveillance of known targets via roll calls need not be modified. In the example of FIG. 13, in the AC period, at the azimuth of the target, a UF4 interrogation that is selective to the address MS1 is added to the $AC_{m+2}$ period (i.e. it is in addition to the UF11 all call).

Figure 14:
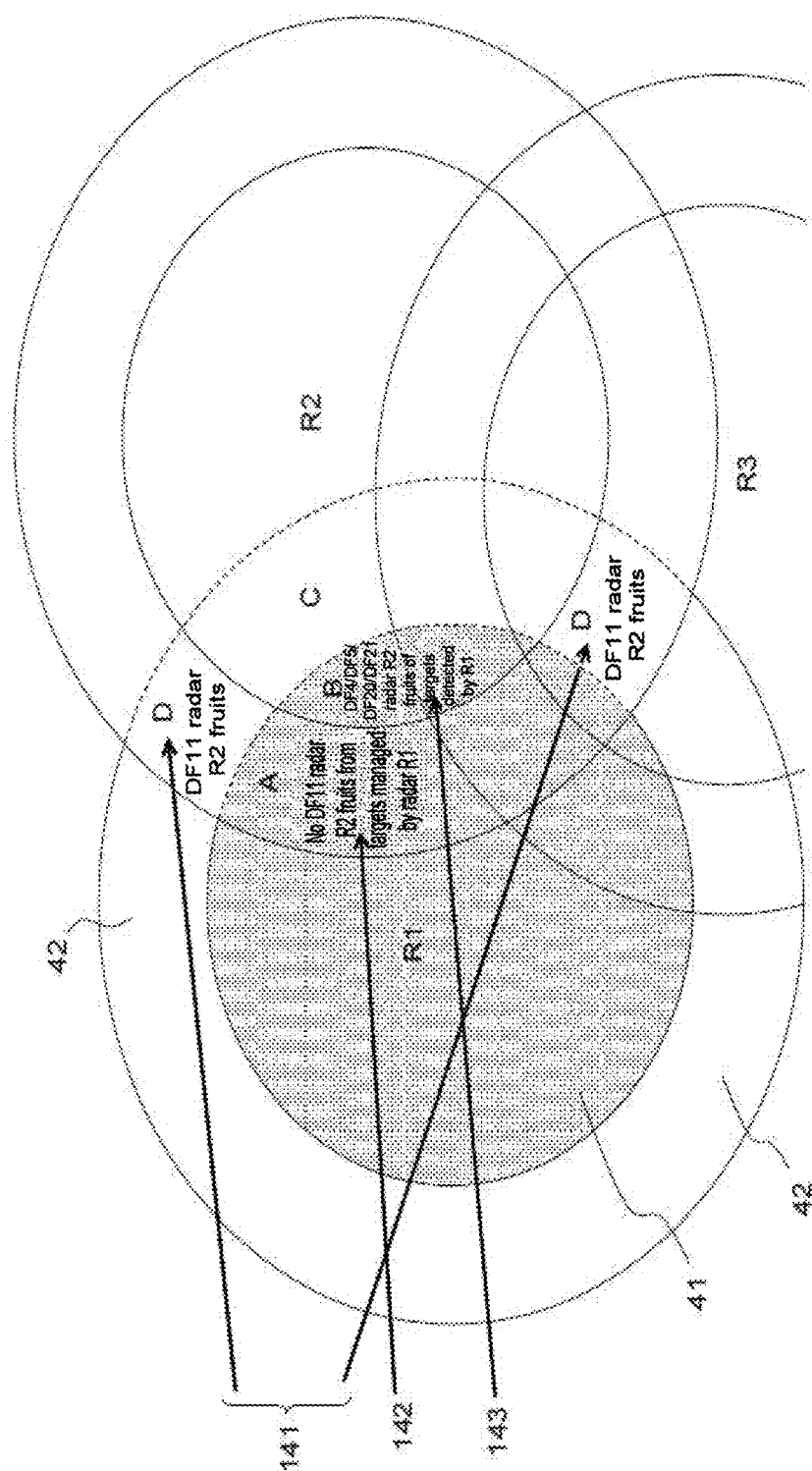
FIG. 14, another illustration of the method according to the invention.

In light of the description of the implementation of the invention that has just been given, FIG. 14 illustrates the principle of the invention in a case involving three radars, and more particularly the second step 32 and the third step 33 (see FIG. 3). The secondary radar considered is still the radar R1, but here there are two nearby radars, the radar R2 and a radar R3. The principle described with respect to R2 is applicable to R3. The radar R1 therefore detects targets not replying to all calls potentially present in its region of coverage, these targets being locked by the radar R2 because of a conflict in II/SI code. In the first step 31, the radar R1 having beforehand extended its range to an extended region 42 and having detected fruits in this region 42, detection proceeds as follows:

the radar R1 detects 141 DF11_R2 fruits (the source of which is the radar R2) in an extended region 42 beyond the region of coverage 41 and of same II/SI code as R1 (detection in the sub-regions D);

the radar R1 observes the absence 142 of DF11_R2 fruits in the region of coverage of R1 that does not overlap with the region of coverage of R2 (sub-region A);

the radar R1 observes the absence of synchronized DF11_R1 reply from aeroplanes exiting its operational coverage (sub-region C).

Under these conditions the radar R1 deduces from the above that there is a conflict in II/SI code between the two radars R1 and R2 (R2 locking replies), this corresponding to sub-step SE4.

From the presence of DF4, DF5, DF20 or DF21 fruits the origin of which is R2 in the region B or C of overlap between the coverages of the two radars R1 and R2, the radar R1 deduces 143 that an aeroplane is present in this region B or C. The azimuth and distance of this unseen target are then determined as described above.

The invention claimed is:

1. A method for detecting conflicts in the II/SI identification code of radars nearby a first radar, being a secondary mode-S radar, comprising:
   a first step wherein:
      a coverage of said first radar is extended to obtain synchronized replies in an extended radar coverage;
      said first radar detects unsolicited unsynchronized replies, named fruits, in a region of extended radar coverage;
      the fruits are associated with mode-S targets of said extended radar coverage, one or more positions of said fruits being determined by interpolation with synchronized detections of said targets, on the basis of a mode-S address of said targets;
   a second step wherein said first radar detects a conflict in II/SI code by analyzing geographic regions of radar coverage common to said first radar and to at least one nearby second radar, a conflict being detected if said first radar:
      detects, in sub-regions of an extended radar coverage region, a presence of a first set of fruits of same II/SI code as said first radar, having as source said nearby second radar;
      observes the absence of one or more of said first set of fruits caused by said nearby second radar in a non-overlapping region of radar coverage, being a region of coverage of said first radar which does not overlap with a region of radar coverage of said nearby second radar;
   an overlapping region of radar coverage, which is an overlap in a radar coverage of said first radar and a radar coverage of said nearby second radar forming a region of conflict in II/SI code;
   a third step wherein said first radar detects targets locked by said nearby second radar in said region of conflict on the basis of detection of one or more of a second set of fruits caused by said nearby second radar in said region of conflict, indicating the presence of a target in said region of conflict;
   targets being pre-located in an azimuthal region inside said region of conflict by exploiting an absolute value of a time difference between each of the second set of fruits of said targets due to said nearby second radar and each of the first set of fruits of other targets of said region of extended radar coverage that are caused by said nearby second radar, an azimuthal position of each of said other targets being known.

2. The method according to claim 1, wherein a precise distancewise and azimuthal location of a target is obtained by positioning selective interrogations in said pre-location azimuthal region of said target, associated with a listening window, wherein a reply is listened for, taking into account an uncertainty in a distance of said target, which is estimated on the basis of a power of the fruits of said target and of characteristics of the first radar, said selective interrogations being transmitted to said target during a roll-call period, or during an all-call period, in addition or instead of an all-call mode-S interrogation.

3. The method according to claim 1, wherein said first radar transmits all-call interrogations, in said first step, and in response to said all call interrogations of said first radar, listens for synchronized replies after an all-call period and during a roll-call period provides additional synchronized replies in said extended radar coverage region, said additional replies thus obtained being processed as other synchronized replies in the all-call period to construct hits having attributes of a conventional mode-S hit.

4. A secondary radar, configured to implement the method according to claim 1, the secondary radar being the first radar as recited in claim 1.

5. The secondary radar according to claim 4, comprising listening periods associated with interrogations transmitted by said secondary radar, including means for continuously processing unsynchronized mode-S replies, independently of said listening periods.

6. The secondary radar according to claim 5, comprising an antenna having antenna radiation patterns, said processing means detect and decode said unsynchronized mode-S replies by exploiting said radiation patterns of the antenna of said radar separately:
   to detect all the, unsynchronized and synchronized, replies received via said antenna;
   to decode replies of any type, data of the messages and to extract the mode-S address therefrom;
   to enrich each decoded reply with its characteristics, said characteristics being at least a detection time, an azimuth of a main lobe of the antenna on detection and a power received through the antenna radiation patterns.

7. The secondary radar according to claim 4, comprising an extractor of hits in said region of extended coverage, said hits being extracted beyond an operational range of said radar solely with a view to location and identification of targets via their mode-S address.

8. The secondary radar according to claim 4, comprising processing means for detecting conflicts in II/SI codes and for detecting and locating targets locked by said nearby second radar in any regions of conflict in II/SI code, said means:
   associating fruits with synchronized hits;
   geographically analyzing sources of fruits that are unsynchronized replies the cause of which is the nearby second radar;
   isolating a presence of targets not detected by said secondary radar in said region of conflict;
   evaluating the azimuthal pre-location of said targets with respect to said secondary radar in said region of conflict;

detecting and locating said targets distancewise and azimuthally in order to allow said secondary radar to continue its surveillance function as for all the other targets.

* * * * *